June 14, 1949.    H. A. SHERWOOD    2,473,177
BICYCLE COASTER BRAKE
Filed July 25, 1947    2 Sheets-Sheet 1

INVENTOR.
HENRY ALLAN SHERWOOD
BY
Kenyon & Kenyon
ATTORNEYS

INVENTOR.
HENRY ALLAN SHERWOOD
BY
Kenyon & Kenyon
ATTORNEYS

Patented June 14, 1949

2,473,177

UNITED STATES PATENT OFFICE 2,473,177

BICYCLE COASTER BRAKE

Henry Allan Sherwood, New York, N. Y.

Application July 25, 1947, Serial No. 763,554

3 Claims. (Cl. 192—6)

This invention relates to bicycle coaster brakes which permit the rider to coast without pedaling and to brake by back pedaling.

One object is to provide an arrangement for frictionally retarding the rotation of the operating nut of such a brake, which does not use metal spring elements and which provides non-metallic frictional surfaces of less elasticity but greater elastic deformability than metal and which are of maximum areas. This operating nut rides a screw connecting with the sprocket wheel worked by the bicycle pedals, and functions with forward pedaling to clutch the sprocket wheel to the bicycle hub to drive the bicycle during which time the nut must turn with the hub. When pedaling stops the nut screws itself along the screw to effect declutching so the bicycle coasts, and upon back pedaling the nut is screwed farther along to provide brake-applying force. The nut must be frictionally retarded from turning with the screw, for it to perform these operating functions, and this must be done frictionally since the nut must turn during the transmission of driving force to the hub. Metal spring elements are usually used, in the form of frictional fingers and the like, but these are subject to fatigue failure and are therefore unreliable. Heretofore frictional surfaces provided by non-metallic material of easy elastic deformability as exemplified by soft rubber, cork, and the like, have been usually avoided because the prior art could not provide large enough frictionally interworking areas to obtain good service life.

Another object is to provide a bicycle coaster brake incorporating a lock in its construction, which positively locks the hub against rotation for theft prevention in such a manner that the bicycle cannot be damaged should an effort be made to operate it when the lock is on. In this connection, an equally important object is to incorporate a lock into the construction of a bicycle coaster brake in such a manner that any tendency for it to lock while the bicycle is in operation is either prevented, or is attended by a warning to the bycyclist.

A specific example of a bicycle coaster brake incorporating the principles of the invention is illustrated by the accompanying drawings in which.

Figure 1:
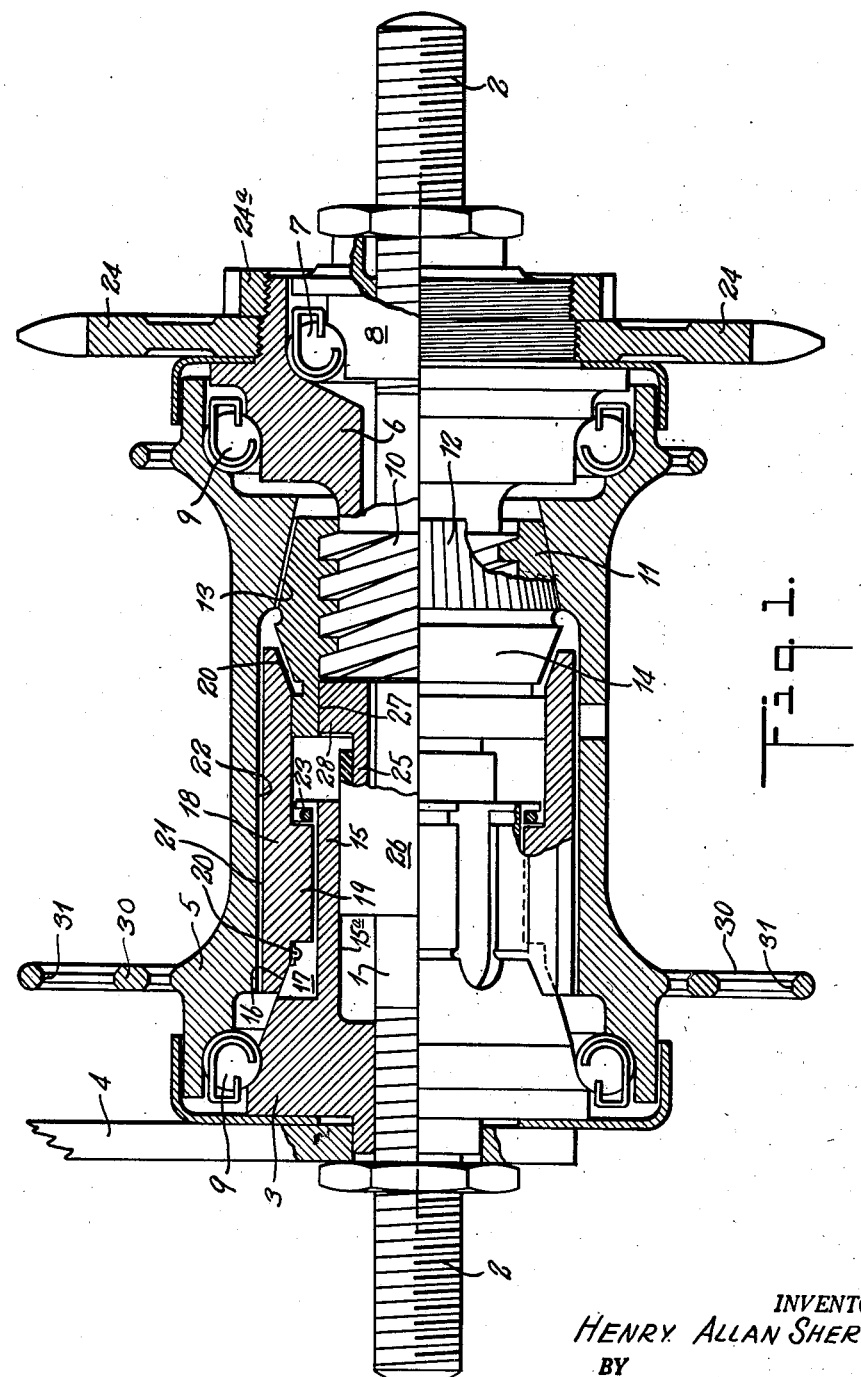
Fig. 1 is a half-sectioned side view of this example.
Figure 2:
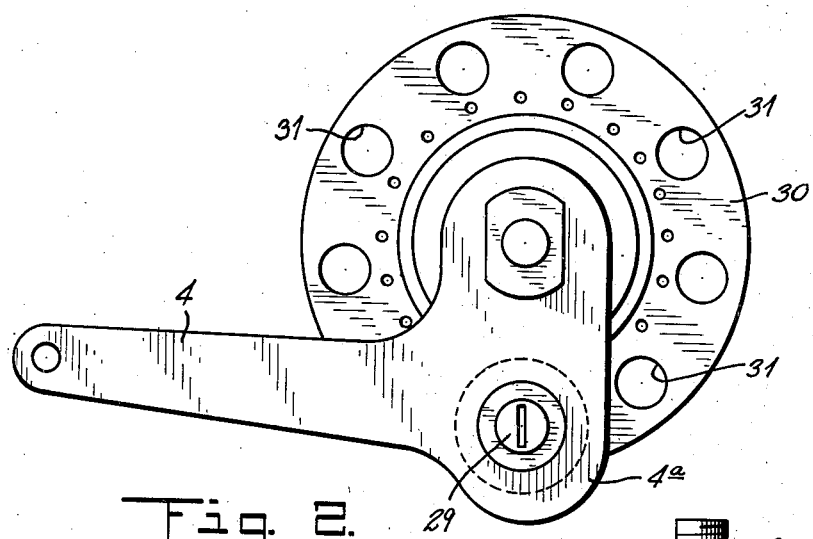
Fig. 2 is an end view looking at the brake arm.
Figure 3:
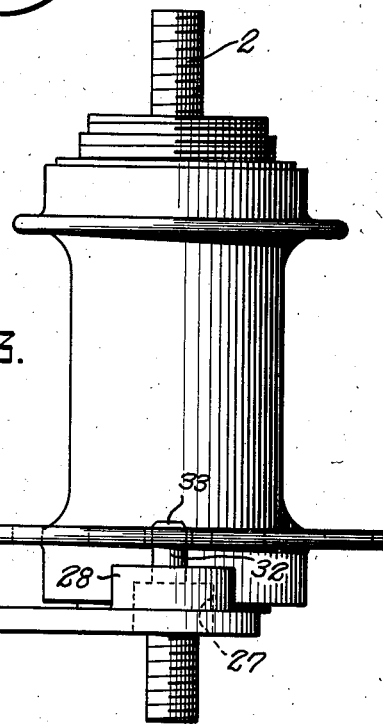
Fig. 3 is a top view.
Figure 4:
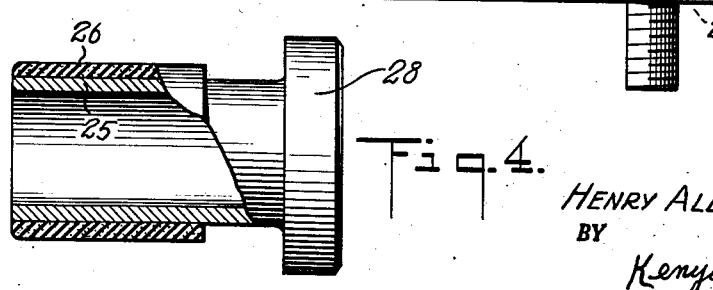
Fig. 4 is a detail.

More specifically, these drawings show an axle 1 having threaded ends 2 on one of which is screwed a bearing nut 3 locked against rotation by a brake arm 4, the end of which fastens to a bicycle frame. A wheel hub 5 and a sprocket hub 6 encircle the axle. The sprocket hub 6 runs freely on ball bearings 7 in a raceway formed by the inner face of the sprocket hub and the outer face of a bearing nut 8 screwed on the other threaded end 2 of the axle 1. The sprocket hub 6 and the bearing nut 3 have outer peripheral portions and the wheel hub 5 has inner peripheral portions respectively providing raceways for ball bearings 9 journaling the wheel hub. The bearing nut 3 and bearing nut 8 are screwed together to get the proper bearing adjustment. The sprocket hub 6 and the wheel hub 5 can freely rotate relative each other and relative the axle 1, while the latter and the bearing nut 3 are stationary relative the bicycle frame.

A hollow screw 10 concentrically encircles the axle 1 and is in the form of a cantilever extension of the sprocket hub 6, so this screw is rotatively free relative the axle and wheel hub. A brake and clutch controlling nut 11 is threaded on this screw 10, its outer periphery having an outwardly facing clutch cone 12 engaging a clutch cone 13 on the inside of the adjacent end of the wheel hub 5 when the nut 11 screws outwardly, and an inwardly facing brake shoe operating cone 14 for working the brake elements when the nut screws inwardly. The bearing nut 3 has an inwardly extending cantilever hub 15 integral therewith and providing an inwardly extending brake operating cone 16 and longitudinal guideways 17 inwardly extending therefrom. Brake shoe segments 18 encircle this hub 15 with integral guides 19 riding in the guideways 17, and mutually opposite inclined ends 20 for cooperation with the cones 14 and 16. These segments have braking surfaces 21 which bear against a brake drum 22 formed on the inside of the wheel hub 5. A clip ring 23 fits a peripheral groove in the inner end of the cantilever hub 15, and limits inward sliding of the brake shoes 18, by forming abutments in the brake shoe guideways 17.

The usual sprocket 24 is screwed onto the sprocket hub 6 and locked by a sprocket lock nut 24a. Therefore, when the bicyclist pedals, the sprocket 6 receives the operating force. If the controlling nut 11 is restrained from rotating with the screw 10, with the restraint at least sufficient to overcome the screw friction, with forward pedaling this controlling nut 11 screws outwardly so that its clutch cone 12 engages the clutch cone 13 on the inside of the adjacent end of the wheel hub 5. In that event, the driving force is properly transmitted to the wheel hub 5 to drive the bicycle. If the bicyclist stops pedaling, the screw 10 stops rotating while the nut 11 continues to be turned by the interengaging clutch cones, due to the bicycle coasting and continuing to turn the hub 5. This screws the nut 11 inwardly until the clutch cones separate, whereupon free-wheeling coasting occurs. Back pedaling turns the screw 10 backwardly and, if the control nut 11 does not turn due to a restraint previously described the nut 11 screws itself inwardly so that its brake shoe operating cone 14 wedges the brake shoe segments outwardly by working against their adjacent inclined ends 20, while applying longitudinal force causing their other inclined ends 20 to be wedged outwardly by the inwardly extending brake operating cone 16 of the bearing nut 3. Forward pedaling screws the nut 11 outwardly to relieve this wedging action so that the brake shoe segments release, the nut then being again in free-wheeling coasting position.

Obviously the operation of the brake depends entirely upon the use of some device to prevent or retard the control nut 11 from turning with the screw 10, because this control nut cannot be screwed in either direction from its coasting position, if the control nut turns with the screw 10. The prior art has never provided a complete solution to the apparently simple problem of providing a rugged arrangement for preventing the control nut from rotating with the sprocket hub screw without interfering with the operation of the other elements.

The first mentioned object noted at the beginning of this specification, is attained by providing a cantilever hub 25 fixed to the inner end of the nut 11, with a bore having a diameter substantially larger than that of the axle 1 and with this hub 25 encircling the latter. This hub 25 projects from the nut 11 into the annular space inside the hub 15 provided by reason of the latter having a cylindrical bore 15a with a diameter sufficiently larger than the diameter of the axle 1, and the outside diameter of the hub 25, to provide the necessary annular space. The outside of the hub 25 carries a sleeve 26 having a cylindrical outside and made of material having easy elastic deformability in the nature of soft rubber or cork, the term rubber being used to embrace the natural and synthetic products. This material is interposed between the mutually adjacent peripheral surfaces of the two cantilever hubs 15 and 25 and could be fixed to either while being, of course, free from the other. However, if fixed to either it is easier to fix it to the hub 25 with the cylindrical outside of the sleeve 26 frictionally working against the cylindrical bore 15a of the hub 15, and an important advantage of this arrangement is that full advantage is taken of the invention for providing the maximum possible frictional surface areas for working together. The sleeve may be simply slipped over the hub 25 and retained by friction. The hub 25 should be made fairly long since the longer it is the greater is the frictional areas that can be provided. The necessary axial movement of the nut 11 is easily permitted, the hub 25 sliding inside the bore 15a of the hub 15 in an axial direction. The nut is frictionally restrained from rotation, because the outside diameter of the sleeve is slightly larger, when the sleeve is unstrained, than the diameter of the bore 15a, so frictional contact with the bore's inside is effected.

The nut 11 is provided with a counterbore 27 in its inner end facing the hub 15 and the hub 25 has its end adjacent the nut, provided with a stout flange 28 pressed into this counterbore to effect the mounting of the cantilever hub 25 by the inner end of the nut 11. The hub 25 and its flange 28 may be made of metal.

It is to be noted that the hub 15 is not an extra part but is required for the function of providing a proper mounting for the brake shoe segments 18. This normal function is not interferred with in any fashion by the hub 25 working in it nor is any unusual force transmitted to the brake segments. Any small amount of heat that might be generated during the rotation of the hub 25 relative the hub 15 with the non-metallic sleeve 26 interposed and its exterior frictionally sliding on the interior of the hub 15, is easily dissipated since the hub 15 has a direct metallic thermal circuit from it to the bearing nut 3 which is tightly clamped to the bicycle frame and to the brake arm 4. The heating effect is well distributed, in any event, due to the broad frictional areas producing it. The heat cannot be transmitted to the nut 11 to cause its possible binding, since the non-metallic material 26 is a poor heat conductor, and there is no direct metallic thermal circuit between the hub 15 and the nut 11, the circuit being by way of the brake shoe segments 18 which are in relatively loose engagement with the hub 15 and the inner end of the nut 11, if they actually contact the nut at all, during the driving operation of the coaster brake assembly. Heat is not transmitted easily through loose connections.

It is considered preferable to make the sleeve 26 of cork. This material is noted for its long wear when used for frictional drives. It is not ordinarily used for coaster brake assemblies, for the same purpose, because the prior art has not provided any arrangement permitting adequately large interworking frictional surfaces. This defect in the prior art now being overcome by the present invention, it becomes practical and desirable to use cork. However, either synthetic or natural rubber may also be used.

The construction of the brake, and of many prior art coaster brakes, provides the brake arm 4 for fastening to the bicycle frame, and an adjacent spoke hub which mounts the wire spokes of the bicycle wheel. The lock of the present invention is provided by forming the brake arm 4 with a depending shoulder 4a and providing a transverse guideway 27 in this shoulder 4a. Preferably this guideway is surrounded by an inwardly extending housing 28 so that the guideway's length is greater than the normal thickness the brake arm 4 would otherwise provide. A reciprocative lock 29 is mounted in this guideway 27 and is adapted to be pushed inwardly to lock the wheel of the hub 5 or moved outwardly to release the wheel for rotation.

This lock is preferably of the type that is spring-biased outwardly to its inoperative position and which in addition can be locked in either its operative or inoperative positions. This is in the interest of safety, the provision of a lock on a bicycle coaster brake being normally considered a dangerous thing because of the liability of it locking during the operation of the bicycle.

In the case of the present invention the part of the hub 5 that provides the spoke hub is extended radially outwardly to provide a disk ring 30 extending radially outwardly to be opposite the lock 29, and it has a plurality of holes 31 formed transversely through it in the form of an annular series so each hole registers with the lock 29 as the disk ring turns. The lock 29 is preferably provided with a projecting stud 32 of slightly smaller diameter than the holes 31 and its inner end is preferably beveled as at 33.

The above arrangement is of importance because should the lock fail to remain in its outer position for any reason, it cannot gravitationally move to locking or operative position, because of its horizontal arrangement. However, it might tend to drift to a locking position, but should this occur while the bicycle is operating at a speed fast enough to cause a bad accident should locking inadvertently occur, the various holes 31 are at that time rotating rapidly past the stud 33 so the latter cannot move into a locking position in any one of the holes. The beveled end 33 further contributes to this result by its natural cam action. At the same time, as the stud 32 drifts to a dangerous position and while it is being prevented from going farther as just described, it makes a clicking noise as the holes 31 of the disk ring 30 revolve past it with the rotative speed preventing the stud from moving fully into any one hole. This immediately warns the bicyclist of the danger and he can stop and fix the trouble.

It is apparent from the foregoing that the lock provided by the present invention is completely safe for use and is positive in action since it engages the disk ring 30 directly with the brake arm 4 which is in turn securely fastened to the bicycle frame in the usual manner. It is impossible to damage the bicycle should an attempt be made to steal it. With the usual lock consisting of an ordinary padlock with an appropriately large hasp, the usual practice is to apply the lock in such a fashion that the spokes of the bicycle wheel are broken when an attempt is made to steal the bicycle. This trouble is avoided by the present invention. The obvious convenience of having a built-in lock is also enjoyed.

I claim:

1. A coaster brake including a stationary axle, a hollow screw rotatively encircling said axle and receiving the operating force, a hub rotatively encircling said axle and screw with an inwardly facing clutch cone adjacent said screw, a nut screwed on said screw with its outside having an outwardly facing clutch cone cooperating with said clutch hub cone and an inwardly facing brake operating cone, a stationary inwardly facing brake operating cone encircling said axle and spaced opposite said brake operating nut cone, a plurality of brake shoe segments encircling said axle between said brake operating cones with operating ends cooperating therewith so said segments can be wedged radially into contact with the inside of said hub, guides rotatively locking said segments relative to said stationary brake operating cone while leaving them free for longitudinal and radial movement, and a device for at least retarding rotation of said nut and positioned entirely between it and said axle and free from said brake shoe segments and said hub, said guides being formed in a cantilever hub nonrotatively encircling said axle and extending toward the adjacent end of said nut, and said device comprising a hub fixed to said end of said nut and projecting inside the first-named hub, the latter having a bore for receiving the second-named hub and the adjacent surfaces of the two frictionally interengaging.

2. The coaster brake defined by claim 1 with material having easy elastic deformability in the nature of soft rubber or cork interposed between the adjacent surfaces of said hubs and effecting their frictional interengagement.

3. The coaster brake defined by claim 1 with said nut having a counterbore in its end facing the first-named hub and with the second-named hub mounted in said counterbore.

HENRY ALLAN SHERWOOD.

REFERENCES CITED

The following references are of record in the file of this patent:

UNITED STATES PATENTS

| Number | Name | Date |
| --- | --- | --- |
| 577,383 | Leggo | Feb. 16, 1897 |
| 610,507 | White | Sept. 6, 1898 |
| 692,538 | Niemeyer | Feb. 4, 1902 |
| 1,057,537 | Foucher | Apr. 1, 1913 |
| Re. 13,023 | O'Horo | Sept. 28, 1909 |
| Re. 13,946 | Wald | July 13, 1915 |

FOREIGN PATENTS

| Number | Country | Date |
| --- | --- | --- |
| 14,634 | Great Britain | Aug. 13, 1892 |
| 7,360 | Great Britain | Mar. 23, 1914 |